3,517,066
ROSENMUND PROCESS
Harvey Gurien, Maplewood, David Paul Wagner, Clifton, and Albert Israel Rachlin, Verona, N.J., assignors to Hoffmann-La Roche Inc., Nutley, N.J., a corporation of New Jersey
No Drawing. Filed Mar. 22, 1968, Ser. No. 715,178
Int. Cl. C07c 47/52
U.S. Cl. 260—599    17 Claims

ABSTRACT OF THE DISCLOSURE

The present disclosure relates to an improved Rosenmund reduction process. In the improved process, the Rosenmund reaction is conducted in a closed vessel in the presence of an acid acceptor at super atmospheric pressure thereby obtaining the advantages of faster reaction time, more efficient utilization of hydrogen, safer reaction conditions and, in some instances, greater yields of desired product. Conventional solvents, catalysts and catalyst regulators are employed in the improved process.

BACKGROUND OF THE INVENTION

The Rosenmund reduction reaction is a classical method useful in the transformation of organic acids to their corresponding aldehydes. In particular, the Rosenmund reduction consists of the selective hydrogenation of an acid chloride in the presence of a suitable catalyst, such as, for example, a supported palladium catalyst, to the corresponding aldehyde such as is represented by the following reaction:

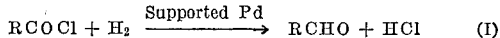

$$\text{RCOCl} + \text{H}_2 \xrightarrow{\text{Supported Pd}} \text{RCHO} + \text{HCl} \qquad (I)$$

where R is an organic radical, such as an aliphatic, aromatic, hydroaromatic, aliphatic-aromatic or heterocyclic radical, which radicals may be substituted or unsubstituted.

The important side reactions that occur with the Rosenmund reduction reside mainly in over reduction, that is reducing the resulting aldehyde to more reduced products. Thus, in some instances, the corresponding aldehyde is reduced either to the corresponding alcohol or in some cases down to the hydrocarbon. The effect of these side reactions may ordinarily be minimized by the use of an appropriate catalyst "poison" or "regulator" which inactivates the catalyst towards reduction of the aldehyde but not of the acid chloride.

Regulators utilized conventionally in the Rosenmund reduction reaction usually contain sulphur. Examples of suitable sulphur containing compounds include "quinoline-S," thioquinanthrene, phenylisothiocyanate, and thiourea among others. In many reducations, however, it has not been found necessary to use a regulator, and in some cases the use of a regulator appears to be definitely disadvantageous.

The Rosenmund reduction method has been found to be generally applicable to the preparation of aliphatic, aromatic, hydroaromatic, aliphatic-aromatic, or heterocyclic aldehydes. The main limitation in scope is the availability of the corresponding acid chloride. The major use for the Rosenmund method has been found generally in the preparation of aromatic and heterocyclic aldehydes.

In some instances it has been found possible to utilize the Rosenmund reduction process to convert the chlorides of dibasic acids to the corresponding aldehyde-acids. This is particularly true for lower aliphatic diacids.

It has also been found possible to reduce acid chloride compounds with the Rosenmund technique where such compounds contain additionally other reducible groups. For example, in the presence of a regulator, para-nitrobenzoyl chloride and also chlorobenzoyl chloride have been converted to the aldehydes without reduction of the nitro group or removal of the nuclear chlorine atom.

The wide applicability of the Rosenmund reduction process is graphically evidenced by the extensive list of compounds produced by this method as reported in the literature up to November 1947 compiled by Erich Mosettig and Ralph Mozingo (E. Mosettig and R. Mozingo, organic Reactions, R. Adams et al., ed. John Wiley and Sons, Inc., New York, N.Y., 1948, vol. IV, p. 362). It must be assumed that the list would be even more comprehensive if brought up to the present date.

The procedure generally employed in the practice of the Rosenmund reduction involves passing a stream of hydrogen through a refluxing solution of the desired acid chloride in solvent until the exit gases are substantially free of hydrogen chloride. The reaction flask contains additionally the desired metal catalyst and optionally may contain the regulator described above. The solvents employed may be a hydrocarbon or to a lesser extent an ether. Suitable hydrocarbons include xylene, toluene, benzene, Tetralin, and Decalin. Preferable solvents include xylene and toluene.

The catalyst used generally comprises a metal supported upon an inert solid carrier vehicle. Examples of metals used as catalysts for the Rosenmund reduction include palladium, osmium, platinum, and nickel. The carrier vehicle can comprise an inorganic salt such as barium sulfate or calcium carbonate or in an alternate embodiment may be a conventional catalyst carrier such as kieselguhr or charcoal. For most uses, palladium will be the metal of preference and barium sulfate will be the carrier vehicle of preference. The metal content of the catalyst mixture can vary from about 2–10 percent by weight. Generally, one part of the catalyst is used for 5–10 parts of acid chloride.

The reaction must be carried out under strictly anhydrous conditions. Thus, the starting material, catalyst, and solvent must be vigorously dried prior to use. Furthermore, care must be exercised to prevent the introduction of moisture during the reaction sequence. The commercial hydrogen utilized during the reaction will be of sufficient purity to allow it to be used after passage through a drying agent such as Drierite.

The reaction is usually run for an extended period of time such as, for example, from 3 to about 36 hours. During this time it is necessary that the solution be vigorously stirred to allow good contacting between the hydrogen stream and the solution.

Examination of the above procedure establishes the following deficiencies relating thereto:

(a) the time for completion of the reaction is extremely long;
(b) the utilization of hydrogen is inefficient in that a vigorous stream of hydrogen must be present for the entire course of reaction with concomitant use of only a small fraction of the hydrogen employed;
(c) the continuous presence of a large amount of hydrogen in conjunction with the heated solvent vapors presents a definite fire and/or explosion hazard during the entire course of the reaction;
(d) the reaction requires rather elevated temperature conditions since high boiling solvents are employed at their reflux temperatures which may be undesirable for heat sensitive compounds and may cause over reduction; and
(e) the exit gases must be monitored for hydrogen chloride content.

The workup of the reaction product is generally straight-forward. Upon completion of the reaction, the catalyst is filtered or removed by centrifugation and the solvent distilled off under reduced pressure. The residue may either be distilled to give crude aldehyde or may be treated directly by dissolving in solvent such as ether-benzene and shaken overnight with a saturated sodium bisulfite solution to yield the bisulfite addition salt. This salt may then be decomposed by use of a base, such as sodium carbonate solution, to yield the pure aldehyde product.

Further details directed to the preparation of the regulation such as quinoline-S or the preparation of the catalyst such as palladium on barium sulfate are readily available by reference to the Mosettig et al. article mentioned previously.

The starting acid chlorides may be prepared from the corresponding acids by treatment with a chlorinating agent such as phosphorus pentachloride, phosphorus oxychloride or thionyl chloride by methods well known in the art.

DETAILED DESCRIPTION OF THE INVENTION

The present invention relates to an improved method of performing the Rosenmund reduction process wherein the aforesaid process is conducted at superatmospheric pressure. In the improved process of the present invention, the reactant materials are introduced into a closed reaction vessel suitable for use in conducting pressure reactions. An example of a suitable apparatus for use in the present invention is a Parr low pressure hydrogenation apparatus.

In conducting the improved Rosenmund reduction process of the present invention it is possible to utilize the same catalyst, regulator, and solvent as was previously described to be conventional in the classical Rosenmund technique. Similarly, the proportion of materials with the exception of the hydrogen used will be the same as previously described. The exceptions to be noted in comparing the present procedure with the classical procedure described above reside mainly in the discovery by the present inventors of novel conditions to be employed for the reaction and in the employment of an acid acceptor in the reaction mixture. For example, the process of the present invention will generally employ a pressure in the range of from about 15.25 to 1,650 p.s.i.a., preferably in the range of from about 20 to 165 p.s.i.a., most preferably 55 to 75 p.s.i.a. The upper limits of pressure are mainly imposed by the possibility of overreducing the aldehyde product to the corresponding alcohol or base hydrocarbon. It is evident that this upper limit will be somewhat flexible and is based upon the identity of the compound undergoing the improved Rosenmund reduction of the present invention.

The purpose of the acid acceptor is to remove the hydrogen chloride produced during the reaction. Hydrogen chloride will adversely effect the reaction due to activation of the catalyst. It is also undesirable due to its possible interaction with certain product aldehydes and also due to its corrosive effect on the reactor vessel. Examples of suitable acid acceptors include salts of weak acids and strong bases which do not form water when neutralizing hydrogen chloride. Examples of such salts include the alkali metal salts of organic acids, e.g., the sodium salt. Most preferable are sodium acetate, sodium propionate, sodium benzoate, etc. Sodium acetate is the acid acceptor of preference. Still other examples of acid acceptors include calcium carbonate, calcium hydride, iron powder, sodium ferro pyrophosphate, etc.

A further variance between the present process and that of the classical technique is to be found in the selection of the temperature conditions for the reaction. Whereas the classical procedure employed conditions at or near the boiling point of the solvent used, the present inventive process will employ a temperature in the range of from about 10 to 150° C., preferably in the range of from about 20 to 100° C., most preferably 30 to 40° C. It is clear therefore that the present invention contemplates utilizing significantly more moderate temperature conditions than was previously employed in the Rosenmund process.

Yet another point of distinction arises from the amount of hydrogen utilized in the reaction. The conventional Rosenmund technique calls for the continuous addition of hydrogen over an exteded period of time thereby using substantially more hydrogen than would be called for by the stoichiometry of the reaction. In direct contrast thereto, the present procedure will generally uilize either the stoichiometric or a slight excess over the stoichiometric amount of hydrogen.

In general, the present process will be conducted for a period of from about 0.5 to 5 hours, preferably in the range of from about 1 to 3 hours. Completion of the reaction is indicated when hydrogen uptake ceases, e.g., when the reactor does not continue to lose pressure as time passes. Therefore, the extra passage of time that the reaction mixture may be in the reactor is not critical since once the required hydrogen uptake has been achieved no further reaction occurs.

Workup of the reaction mixture to yield the desired aldehyde product will be the same as previously described for the classical Rosenmund technique. It is clear from the foregoing that utilization of the process of the present invention results in substantial advantages over the prior technique, which advantages may be summarized as follows: faster reaction time with concomitant elimination of over-reduction, safer operating conditions due to the absence of hydrogen at elevated temperatures in an open system, more efficient use of hydrogen and use of more moderate temperature conditions. The added advantages of increasing product yield will become more evident from examination of the following examples which are presented for the purpose of illustration only and are not meant to limit the scope of the present invention in any manner.

EXAMPLE 1

General procedure for reduction of acid chlorides to aldehyde

Into the reaction vessel of a Parr low pressure hydrogenation apparatus was placed 100 ml. of xylene (dried over calcium hydride) and 16.5 g. (0.20 mole) of freshly fused sodium acetate. The mixture was cooled to 10° C. under nitrogen and 0.066 mole of the acid chloride was added. The catalyst, 4.0 g. of 10 percent Pd-barium sulfate (pre-dried at 110° C. over phosphorus pentoxide), was added to the reaction vessel. This was followed by the optional addition of the desired amount of quinoline-S-regulator. The volume is brought to 210 ml. by the addition of dry xylene and the hydrogenation was carried out at room temperature under initial hydrogen pressure of 65 p.s.i.a. The reaction was continued until no further uptake of hydrogen was observed (approximately 1.5 hours).

After hydrogenation the catalyst was removed by filtration and the xylene filtrate was concentrated to dryness at reduced pressure. To the residue was added 200 ml. of Vogel's bisulfite solution (A.I. Vogel, a Textbook of Practical Organic Chemistry, 3rd edition, John Wiley and Sons, Inc. New York, N.Y., 1957, (p. 322) and the mixture was heated to incipient boiling and maintained for fifteen minutes. The solution was cooled to 40° C. and extracted with two 225 ml. portions of toluene.

The aqueous phase was separated, filtered, and cooled to 20° C. When the bisulfite addition compound was insoluble at 20° C. it was isolated per se (filtered, washed with ether and dried). To obtain the free aldehyde, a solution of the bisulfite addition compound was made alkaline (pH 10–11) by the addition of 30 ml. of 40 percent sodium hydroxide solution. The liberated aldehyde was then identified either by direct comparison of its physical properties or by preparation of its dinitrophenyl hydrazone or semicarbazone derivatives. The broad applicability of the process of the present invention to the conversion of various organic acid chlorides to their corresponding aldehydes is graphically demonstrated in the following table which lists acid chlorides which were successfully converted by the above procedure.

TABLE I

| Acid chloride | Moles [1] | Quinoline-S/g. | Notes [3] |
|---|---|---|---|
| Benzoyl | 0.067 | | Identified as semicarbazone. |
| 2,4-dichlorobenzoyl | 0.067 | 1.38 | |
| Do | 0.067 | | |
| 2-naphthoyl | 0.067 | 1.26 | Identified as dinitro-phenylhydrazone. |
| 3,5-dimethoxy-4-methylbenzoyl | 0.043 | | |
| Furoyl | 0.066 | | Identified as dinitro-phenylhydrazone. |
| Androstene-$\Delta^5$-3$\beta$-ol-17-formoyl-3-acetate. | 0.025 | | ([2]) |
| Stearoyl | 0.066 | 2.0 | Identified as the bisulfite addition compound compared with material purchased from Aldrich Chemical Co. |

[1] The amount of catalyst (10 percent Pd-BaSO$_4$) was 60 g. per mole of acid chloride.
[2] The physical properties of the aldehyde did not agree with those reported in the literature. The identity of the product was confirmed by microanalysis and NMR. Observed M.P. 156–158° C.; [$\alpha$]D$^{25}$=−18.678 (C=1.055, chloroform); reported M.P. 169–171° C., [$\alpha$]D$^{25}$=−13.5° (C=.505 chloroform), K. Miescher et al., Helv. 23, 1367 (1940).
[3] Isolated as the aldehyde unless indicated.

EXAMPLE 2

Preparation of 3,4,5-trimethoxybenzaldehyde

This example demonstrates yet another application of the process of the present invention. Into a 600 ml. capacity glass liner of a rocking autoclave was placed in order: 150 ml. of dry xylene and 24.6 g. (0.30 mole) of freshly fused sodium acetate. The mixture was cooled to 10–15° C. under dry nitrogen and 23.4 g. (0.10 mole) of freshly prepared 3,4,5-trimethoxybenzoyl chloride was added. After shaking, 6 g. of predried 10 percent palladium-barium sulfate catalyst was added to the vessel and the total volume was brought to 300 ml. by the addition of dry xylene. The mixture was hydrogenated at 36° C. under initial hydrogen pressure of 65 p.s.i.a. At the end of 1.5 hours a steady pressure was reached, which corresponded to adsorption of 130 percent of the theoretical amount of hydrogen. The catalyst was filtered and the xylene filtrate was evaporated to dryness at reduced pressure.

To the residue was added 200 ml. of water, the mixture was heated to boiling and added to 170 ml. of boiling Vogel's bisulphite solution. Incipient boiling was continued for 15 minutes and then the solution was cooled to 40° C. and extracted with two 25 ml. portions of toluene. The aquous phase was separated, filtrated, cooled to 20° C. and made alkaline (pH 10–11) by the addition of 30 ml. of 40 percent sodium hydroxide solution. The resulting solid was filtered at 20° C., washed with two 10 ml. portions of cold water and dried in vacuum at 50° C. The above-captioned product was obtained melting at 74–75° C.

EXAMPLE 3

Preparation of 3,4,5-trimethoxybenzaldehyde with different process variables.

The effect of variations in the quantity of quinoline-S regulator and the amount of catalyst were determined in a series of eighth experiments. These experiments were carried out in toluene as solvent at a pressure in the range of about 55–75 p.s.i.a. and involved treatment one hour at room temperature and 2–3 hours to 36–40° C. followed by cooling with agitation overnight. After completion of the reaction, the catalyst was removed by filtration and the filtrate concentrated in vacuo to dryness to yield the crude aldehyde. The results were evaluated by the melting point of the crude residue and by vapor phase chromatography of this material. Duplicate chromatographic runs were used employing an F and M model 810-dual flame detector with helium gas flow of 120 ml. per minute. The first of the duplicate runs utilized a 4' x ¼" S.S. column of 3 percent Epon Resin 10001 on Diatoport S at 200° C. The second run utilized a 4' x ¼" S.S. column of 3 percent silicon rubber of Diatoport S at 170° C. The results are tabulated in the table below with the yields being indicated to be + or − depending upon whether it exceeded or was less than the best yield noted in the literature for the conventional Rosenmund reduction procedure for this compound, e.g., 80 percent as indicated in Table II on page 373 of the article by Mosettig et al. cited above.

The data presented in the table below demonstrates that the present procedural modification of the Rosenmund reaction can produce superior yields than obtainable by the classical method.

TABLE II

| Exp. No. | Quinoline-S, ml. | 10% Pd/ C. g. | Crude M.P. °C. | Yield SE-30 | Yield Epon | Notes (g) |
|---|---|---|---|---|---|---|
| 1 | 1 | 3.0 | 63–68 | + | + | a, b |
| 2 | 1 | 2.3 | 69–71.5 | + | + | a |
| 3 | 1 | 3.0 | 70–72.5 | + | + | a |
| 4 | 1 | 2.3 | 70–72 | + | + | a, c |
| 5 | 1 | 2.3 | 70–72 | + | + | a, c |
| 6 | 0.3 | 2.3 | 64–69 | + | + | a, c, d |
| 7 | 1 | 2.3 | 50–82 | + | − | a, c, e |
| 8 | 4 | 10 | 69–72 | + | + | c, f |

NOTES:
a. Acid chloride=23 g. (0.1 mole), NaAc=30 g., total volume=600 ml.
b. Sodium acetate in this run was not fused.
c. Addition of Darco D.K. (equal to catalyst weight prior to filtration).
d. 5 percent Pd/C used in this run.
e. Total volume=210 ml. in this run.
f. Acid chloride=115 g. (0.5 mole), NaAc=150 g., total volume=3,000 ml.
g. All catalysts dried in vacuum oven at 115° C.

EXAMPLE 4

Variations in the preparation of 3,4,5-trimethoxybenzaldehyde using 0.01 mole of acid chloride The following variables were tested by conducting repeated experiments at the 0.01 mole quantity level for the starting acid chloride:

(a) catalyst identity,
(b) catalyst quantity,
(c) sodium acetate quantity,
(d) temperature, (e) reaction duration,
(f) quantity of quinoline-S regulator,
(g) identity of solvents.

for the classical Rosenmund technique. The data for the 0.01 mole experiments are tabulated below in the following table.

TABLE OF 0.01 MOLE EXPERIMENTS AT 65 P.S.I.A.

| Exp. | Cat. | G. | NaAc, C. g. | Time, hr. | Quin. S, ml. | Solvent | Crude M.P., C. | V.P.C. SE-30 | V.P.C. Epon | Notes |
|---|---|---|---|---|---|---|---|---|---|---|
| 1 | 10% Pd/BaSO₄ | 0.6 | 2.46 | 40 | 0.66 | Xylene | — | | | Catalyst not dried. |
| 2 | 10% Pd/BaSO₄ | 0.6 | 2.46 | 25 | 0.33 | do | — | | | Do. |
| 3 | 10% Pd/BaSO₄ | 0.6 | 2.46 | 25 | 5.0 | do | — | | | |
| 4 | 10% Pd/BaSO₄ | 0.6 | 3.0 | 30-51 | 5.0 | do | — | | | |
| 5 | 10% Pd/BaSO₄ | 0.6 | 3.0 | 37-40 | 5.0 | do | — | + | | |
| 6 | 10% Pd/BaSO₄ | 0.6 | 3.0 | 32-37 | 5.0 | do | — | | | |
| 7 | 10% Pd/BaSO₄ | 0.6 | 3.0 | 32-36 | 2.0 | do | — | | | |
| 8 | 10% Pd/BaSO₄ | 0.6 | 3.0 | 32-38 | 4.0 | do | — | | | |
| 9 | 10% Pd/BaSO₄ | 0.6 | 3.0 | 34-40 | 5.0 | do | 56-60 | + | | |
| 10 | 10% Pd/BaSO₄ | 0.6 | 3.0 | 30-32 | 5.5 | do | — | + | | |
| 11 | 10% Pd/BaSO₄ | 0.6 | 3.0 | 33-37 | 5.5 | 1.0 do | — | | | 85% starting material. |
| 12 | 10% Pd/BaSO₄ | 0.6 | 3.0 | 36 | 6.0 | 0.1 do | — | + | — | |
| 13 | 10% Pd/BaSO₄ | 0.6 | 3.0 | 40 | 6.0 | 0.01 do | — | — | — | |
| 14 | 10% Pd/BaSO₄ | 0.6 | 3.0 | 40 | 5.0 | do | — | — | — | |
| 15 | 10% Pd/BaSO₄ | 0.6 | 3.0 | 25 | 5.0 | EtOAc | 59-64 | — | — | |
| 16 | Repeat of 12 | 0.6 | 3.0 | | | Xylene | — | + | | |
| 17 | 10% Pd/CaCO₃ | 0.6 | 3.0 | 36 | 6.0 | 0.1 do | 61-66 | + | + | |
| 18 | 10% Pd/C | 0.6 | 3.0 | 25 | 6.0 | 0.1 do | — | + | + | |
| 19 | Repeat of 17 | | | | | do | 66-69 | + | + | |
| 20 | 10% Pd/C | 0.6 | 3.0 | 25 | 2.3 | 0.3 do | 58-64 | + | + | |
| 21 | 10% Pd/C | 0.2 | 3.0 | 36-40 | 6.0 | 0.1 do | — | — | + | |
| 22 | 10% Pd/CaCO₃ | 0.6 | 3.0 | 36-39 | 5.5 | do | 59-63 | + | + | |
| 23 | 10% Pd/CaCO₃ | 0.6 | 3.0 | 36-39 | 5.5 | 0.1 Toluene | 56-59 | + | + | |
| 24 | 10% Pd/CaCO₃ | 0.6 | 3.0 | 36-39 | 5.5 | Xylene | — | — | + | |
| 25 | 10% Pd/C | 0.4 | 3.0 | 33 | 5.0 | 0.2 do | 69-72 | + | + | 1 hr. R.T., 2 hrs. 33°, 2 hrs. cool down. |
| 26 | 10% Pd/CaCO₃ | 0.4 | 3.0 | 36 | 6.0 | do | 55-112 | + | — | |
| 27 | 10% Pd/C | 0.4 | 3.0 | 36 | 5.0 | 0.2 do | 56-59 | — | + | |
| 28 | 10% Pd/CaCO₃ | 0.6 | 3.0 | 36 | 5.0 | do | 62-66 | — | + | |
| 29 | 10% Pd/CaCO₃ | 0.6 | | 36 | 5.0 | do | — | — | — | |
| 30 | Pd Black | 0.06 | 3.0 | 36 | 5.0 | do | — | — | | 40% starting material. |
| 31 | Pd Black | 0.2 | 3.0 | 36 | 5.0 | do | — | — | | |
| 32 | 10% Pd/CaCO₃ | 0.6 | 3.0 | 36 | 5.0 | 0.016 do | 63-65 | + | + | |
| 33 | 10% Pd/C | 0.3 | 3.0 | 36 | 5.0 | 0.1 do | 68-70 | + | + | |
| 34 | 10% Pd/CaCO₃ | 0.6 | 3.0 | 36 | 5.0 | 0.01 do | 65-67 | + | + | |
| 35 | 10% Pd/C | 0.2 | 3.0 | 36 | 5.0 | 0.1 do | 68-70 | + | + | |
| 36 | 10% Pd/CaCO₃ | 0.6 | 3.0 | 36 | 5.0 | 0.016 Benzene | 68-71 | + | + | |
| 37 | 10% Pd/C | 0.3 | 3.0 | 36 | 5.0 | 0.01 do | 62-69 | + | + | |
| 38 | 10% Pd/CaCO₃ | 0.6 | 3.0 | 36 | 5.0 | 0.01 do | 62-71 | + | + | |
| 39 | 10% Pd/C | 0.2 | 3.0 | 36 | 5.0 | 0.01 do | 66-67 | + | + | |
| 40 | 10% Pd/CaCO₃ | 0.3 | 3.0 | 36 | 5.0 | do | 64-67 | + | + | |
| 41 | 10% Pd/C | 0.2 | 3.0 | 36 | 5.0 | do | 67-70 | + | + | |
| 42 | 10% Pd/C | 0.3 | 3.0 | 25 | 3.0 | 0.1 Xylene | 56-63 | + | + | At 165 p.s.i.a. |
| 43 | 10% Pd/C | 0.3 | 3.0 | 36 | 5.0 | 0.1 Toluene | 71-73 | + | + | |
| 44 | 10% Pd/CaCO₃ | 0.6 | 3.0 | 36 | 5.0 | 0.1 do | 60-64 | + | + | |
| 45 | 10% Pd/CaCO₃ | 0.6 | 3.0 | 36 | 5.0 | do | 56-60 | + | + | |
| 46 | 10% Pd/C | 0.3 | 3.0 | 36 | 5.0 | 0.1 do | 72-74 | + | + | |
| 47 | 10% Pd/C | 0.1 | 3.0 | 36 | 5.0 | 0.01 do | 63-67 | + | + | |
| 48 | 10% Pd/C | 0.3 | 3.0 | 36 | 5.0 | 0.10 do | 68-71 | + | + | |
| 49 | 10% Pd/C | 0.6 | Notes | 36 | 5.0 | 0.2 do | 51-74 | — | — | .02 NaAc+1.2 g. Fe. |
| 50 | 10% Pd/C | 0.3 | Notes | 36 | 5.0 | 0.1 do | 47-63 | — | — | 0.5 g. CaH₂, NaAc not used. |
| 51 | 10% Pd/C | 0.3 | Notes | 36 | 5.0 | 0.1 do | 59-63 | + | + | 3.2 g. NaFeP₄O₇, NaAc not used. |
| 52 | 10% Pd/C | 0.2 | 2.3 | 36 | 5.0 | 0.05 do | 47-65 | — | | |
| 53 | 10% Pd/C | 0.3 | 3.0 | 36 | 5.0 | 0.1 do | 69-71 | + | + | |
| 54 | 10% Pd/C | 0.3 | 3.0 | 36 | 5.0 | 0.1 do | 69-72 | + | + | |
| 55 | 10% Pd/C | 0.3 | 3.0 | 25 | 5.0 | do | 58-66 | + | + | |
| 56 | 10% Pd/C | 0.2 | 3.0 | 36 | 5.0 | do | 52-62 | — | — | |
| 57 | 10% Pd/C | 0.3 | 3.0 | 36 | 5.0 | do | 59-105 | + | | NaAc, not used. |
| 58 | Notes | 0.3 | 3.0 | 36 | 5.0 | do | 56-63 | + | + | 1=1 mixture of Pd/C, 10% Pd/BaSO₄. |
| 59 | 10% Pd/C | 0.3 | 3.0 | 25 | 3.5 | 0.1 do | 68-71 | + | + | NaAc, dried at 110° in vacuo. |
| 60 | 10% Pd/C | 0.3 | 1.0 | 36 | 5.0 | 0.1 do | 63-67 | + | + | |
| 61 | 10% Pd/C | 0.3 | 2.0 | 36 | 5.0 | 0.1 do | 58-65 | + | + | |
| 62 | 10% Pt/C | 0.3 | 3.0 | 36 | 5.0 | 0.1 do | 67-77 | — | | |

The general procedure for these 0.01 mole experiments is as follows. Into a reaction vessel was placed 75 percent of the dried solvent and the required amount of freshly fused sodium acetate. The oven dried catalyst was then washed into the warm mixture. At 40–50° C., 0.01 mole of 3,4,5-trimethoxybenzoyl chloride was added and the volume adjusted to 100 ml. by the addition of more solvent. When moderator was used, it was added last. The hydrogenation was carried out at the desired temperature and pressure. After completion of the reaction, the catalyst was removed by filtration and the filtrate concentrated to dryness in vacuo to yield the crude aldehyde.

As before, the results were evaluated by the melting point of the crude residue and by duplicate analysis using a vapor phase chromatograph, the latter again being compared to the best yield level established by the literature.

Examination of the above table indicates that the present inventive procedure will result in a yield superiority over use of the classical technique in a great majority of the experimental conditions used It should further be pointed out that in all cases the advantages of the present invention relating to safe operating conditions, efficient utilization of hydrogen, rapid reaction rate, and moderate temperature conditions are being obtained.

EXAMPLE 5

Effect of pressure variation on the preparation of 3,4,5-trimethoxy-benzaldehyde This example demonstrates the wide utility of the process of the present invention over a variable pressure range. The experimental technique utilized in this example was identical to that of Example 3 with the exception that the pressure utilized in the reaction was varied with runs being conducted at 15.25 p.s.i.a., 65 p.s.i.a., and 165 p.s.i.a. The results are tabulated below in the following table.

| Exp. | Acid chloride Moles | Acid chloride G. | NaAc, g. | Vol., ml. | Reg., ml. | 10% Pd/C, g. | Crude, M.P., °C. | Yield SE-30 | Yield Epon | Pressure, p.s.i.a. | Notes |
|---|---|---|---|---|---|---|---|---|---|---|---|
| 1 | 0.1 | 23 | 30 | 600 |     | 2.3 | 54–62 | + | + | 15.25 | |
| 2 | 0.1 | 23 | 30 | 600 |     | 2.3 | 57–67 | + | + | 15.25 | |
| 3 | 0.1 | 23 | 3.0 | 600 | 0.1 | 0.3 | 56–63 | + | + | 165 | Solvent was xylene. |
| 4 | 0.1 | 23 | 30 | 600 | 1   | 2.3 | 69–71.5 | + | + | 65 | |

It will be noted upon examination of the above table that superior yields in product quality were obtained at the pressure levels tested thus establishing the wide applicability of the superatmospheric procedure of the present invention.

We claim:
1. The process of reducing a carbonyl chloride to the corresponding aldehyde in the presence of hydrogen which process comprises reacting said carbonyl chloride compound with hydrogen at superatmospheric pressure in the presence of a metal catalyst selected from the group consisting of palladium, osmium, platinum and nickel and an acid acceptor selected from the group consisting of (a) salts of weak acids and strong bases which do not form water when neutralizing hydrogen chloride, (b) calcium carbonate, (c) calcium hydride, (d) iron powder and (e) sodium ferro pyrophosphate.

2. The improved process of claim 1 wherein said metal catalyst is supported on a solid catalyst carrier.

3. The improved process of claim 1 wherein said process is carried out at a pressure in the range of from about 15.25 to 1650 p.s.i.a. and a temperature in the range of from about 10 to 150° C.

4. The improved process of claim 1 wherein a catalyst regulator selected from the group consisting of quinoline-S, thioquinanthrene, phenylisothiocyanate and thiourea and an inert solvent are additionally present in the reaction mixture.

5. The improved process of claim 1 wherein said reaction is continued until the uptake of hydrogen ceases.

6. The improved process of claim 1 wherein said acid acceptor is sodium acetate.

7. An improved process for the preparation of aromatic aldehydes from their corresponding aromatic carbonyl chlorides, said process comprising reacting said aromatic carbonyl chloride with hydrogen at a pressure in the range of from about 15.25 to 1650 p.s.i.a. and a temperature in the range of from about 10 to 150° C. in the presence of a palladium catalyst and an acid acceptor selected from the group consisting of (a) salts of weak acids and strong bases which do not form water when neutralizing hydrogen chloride, (b) calcium carbonate, (c) calcium hydride, (d) iron powder and (e) sodium ferro pyrophosphate and recovering the desired aromatic aldehyde as product.

8. The improved process of claim 7 for the preparation of aromatic aldehydes from their corresponding carbonyl chlorides wherein said reaction mixture further contains an inert aromatic hydrocarbon solvent, and a sulfur-containing catalyst regulator selected from the group consisting of quinoline-S, thioquinanthrene, phenylisothiocyanate and thiourea.

9. The improved process of claim 7 wherein said aromatic carbonyl chloride is benzoyl chloride and said product aldehyde is benzaldehyde.

10. The improved process of claim 7 wherein said aromatic carbonyl chloride is 2,4-dichlorobenzoyl chloride and said product aromatic aldehyde is 2,4-dichlorobenzaldehyde.

11. The improved process of claim 7 wherein said aromatic carbonyl chloride is 2-naphthoyl chloride and said product aromatic chloride is 2-naphthaldehyde.

12. The improved process of claim 7 wherein the aromatic carbonyl chloride is 3,5-dimethoxy-4-methylbenzoyl chloride and said product aromatic aldehyde is 3,5-dimethoxy-4-methylbenzaldehyde.

13. The improved process of claim 7 wherein said aromatic carbonyl chloride is 3,4,5-trimethoxybenzoyl chloride and said product aromatic aldehyde is 3,4,5-trimethoxybenzaldehyde.

14. An improved process for the preparation of 3,4,5-trimethoxybenzaldehyde said process comprising reacting 3,4,5-trimethoxybenzoyl chloride with hydrogen in the presence of a palladium catalyst, an acid acceptor selected from the group consisting of salts of weak acids and strong bases which do not form water when neutralizing hydrogen chloride, calcium carbonate, calcium hydride, iron powder and sodium ferro pyrophosphate, an inert solvent and a catalyst regulator selected from the group consisting of quinoline-S, thioquinanthrene, phenylisothiocyanate and thiourea at a pressure in the range of about 20 to 165 p.s.i.a. and a temperature in the range of about 20–100° C.

15. The improved process of claim 14 wherein said acid acceptor is sodium acetate.

16. The improved process of claim 14 wherein said catalyst is 10% palladium on carbon.

17. The improved process of claim 14 wherein said inert solvent is selected from the group consisting of toluene and xylene.

References Cited

Adams et al., Organic Reactions, vol. IV (1948), pp. 362–377.

BERNARD HELFIN, Primary Examiner

U.S. Cl. X.R.

260—347.8, 397.4, 598, 600, 601